United States Patent
Li et al.

(10) Patent No.: US 8,076,018 B2
(45) Date of Patent: Dec. 13, 2011

(54) BATTERY COVER ASSEMBLY WITH A LOCKING MECHANISM

(75) Inventors: Chang-Zhi Li, Shenzhen (CN); Jin Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 521 days.

(21) Appl. No.: 12/343,100

(22) Filed: Dec. 23, 2008

(65) Prior Publication Data
US 2010/0143794 A1    Jun. 10, 2010

(30) Foreign Application Priority Data
Dec. 8, 2008    (CN) .......................... 2008 1 0306022

(51) Int. Cl.
*H01M 2/10*    (2006.01)

(52) U.S. Cl. ............. 429/96; 429/97; 429/100; 429/175

(58) Field of Classification Search ..................... 429/96, 429/97, 100, 175, 121; 206/703, 705; 361/679.01; 224/902; 292/277, 263, 270, 317, 318, 321
See application file for complete search history.

(56) References Cited

FOREIGN PATENT DOCUMENTS
JP    2006-32089    *    2/2006
* cited by examiner

*Primary Examiner* — Raymond Alejandro
(74) *Attorney, Agent, or Firm* — Altis Law Group, Inc.

(57) ABSTRACT

A battery cover assembly for a portable electronic device, the battery cover assembly includes a housing, a removeable battery cover, and a locking mechanism. The housing defines a receiving hole. The battery cover forms a latching portion. The locking mechanism latches the cover to the housing. The locking mechanism includes a disked-shape operating member and an elastic member. The operating member rotatably engages in the receiving hole of the housing, and the operating member disposes a locking block releasably and elastically engaging with the latching portion of the battery cover. The elastic member is arranged along one portion of an outer peripheral wall of the operating member. One end of the elastic member abuts the housing, and the other end thereof abuts the operating member.

10 Claims, 6 Drawing Sheets

BATTERY COVER ASSEMBLY WITH A LOCKING MECHANISM

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
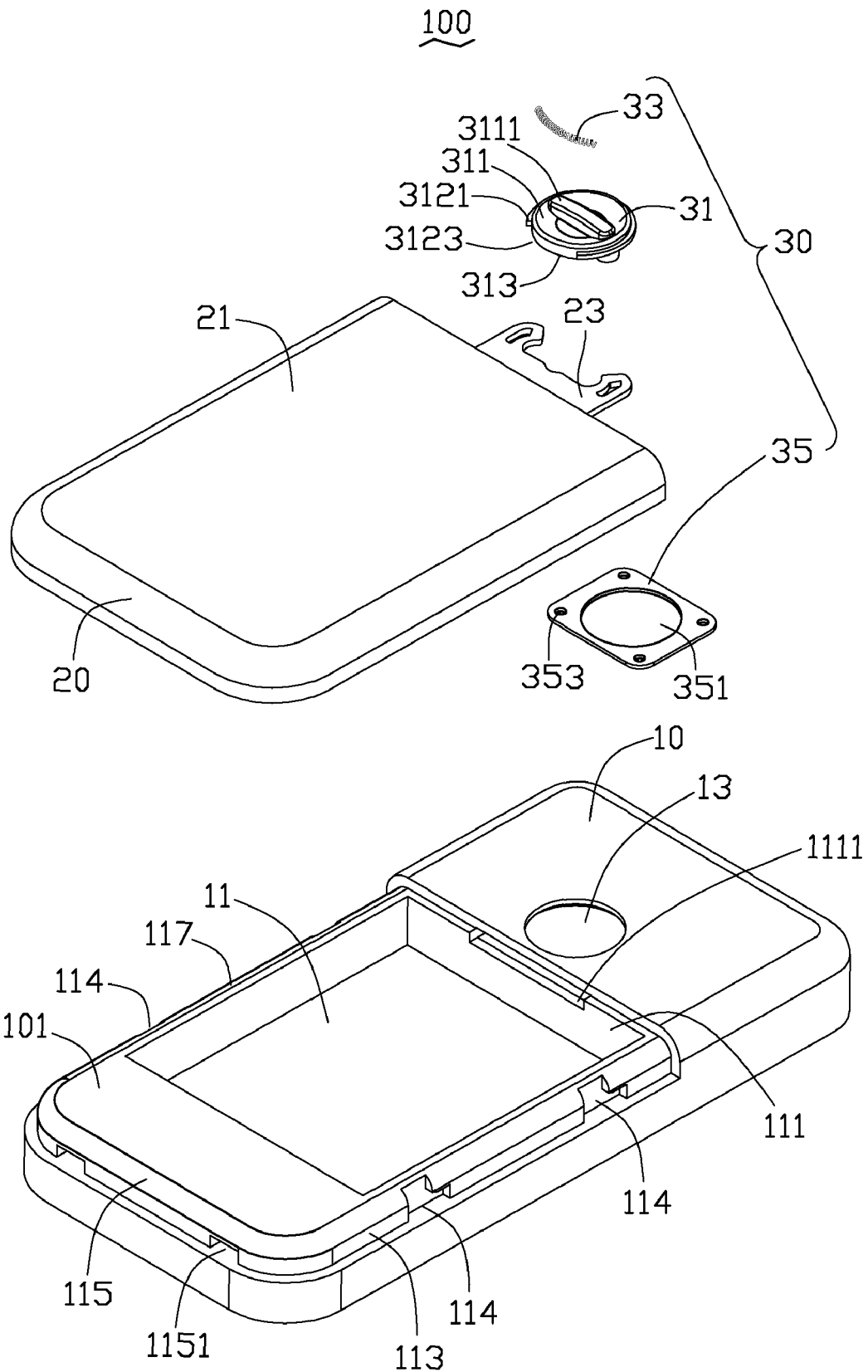
FIG. 1 is an exploded, isometric view of a portable electronic device employing a battery cover assembly in accordance with an exemplary embodiment.

FIG. 1 shows a portable electronic device 100, such as a mobile phone, employing a battery cover assembly. The mobile phone 100 is an exemplary application, for the purposes of describing details of a battery cover assembly of an exemplary embodiment. The battery cover assembly incorporates a housing 10, a removeable battery cover 20, and a locking mechanism 30. The locking mechanism 30 releasably latches (i.e. attaching, locking, engaging) the removeable battery cover 20 to the housing 10.

The housing 10 includes a first surface 101 and an opposite second surface 103. The first surface 101 of the housing 10 is recessed to form a battery cavity 11 with an end wall 111. The end wall 111 defines a rectangular slot 1111.

Figure 2:
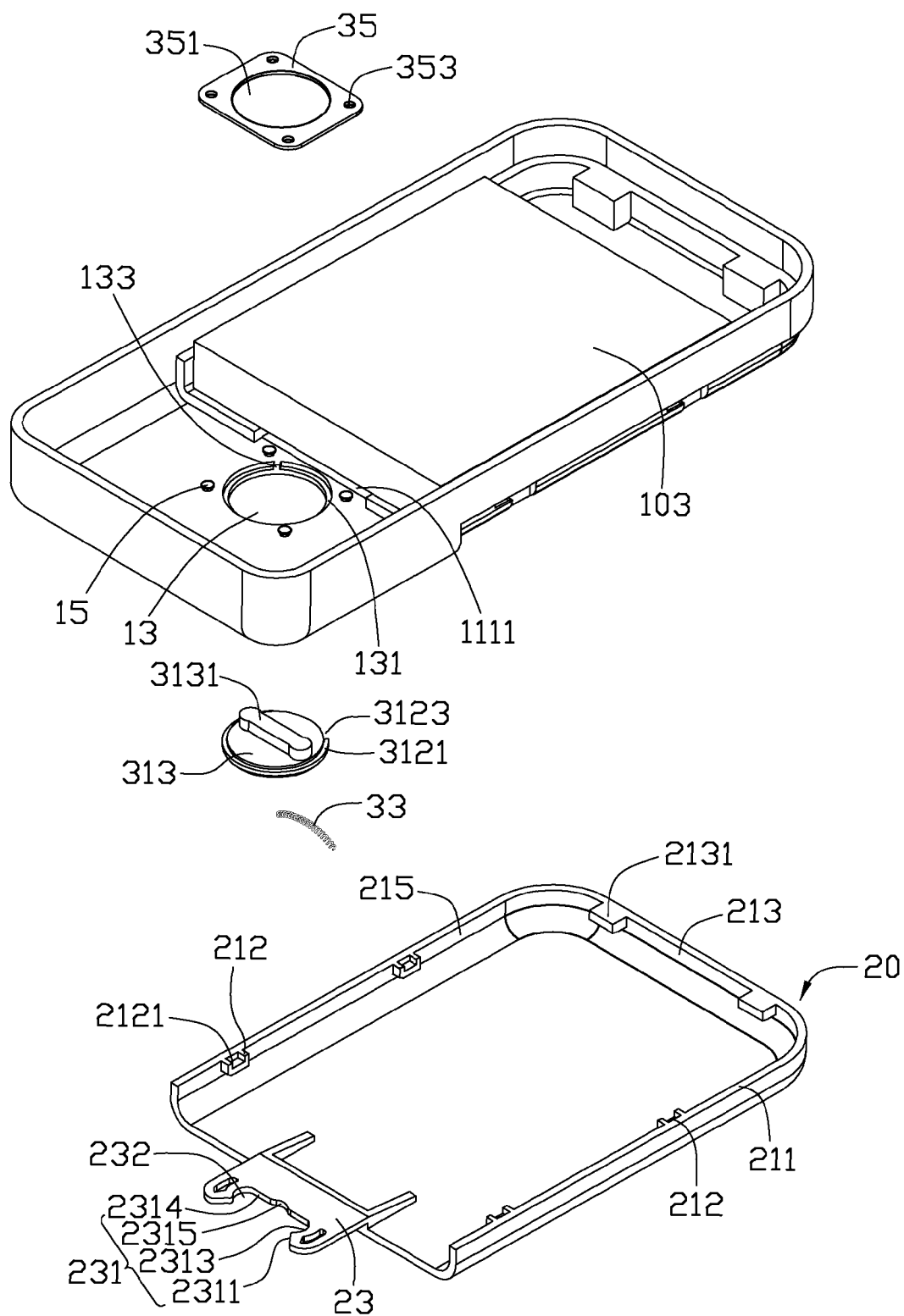
FIG. 2 is similar to FIG. 1, but viewed from another aspect.

Referring to FIG. 2, the first surface 101 defines a receiving hole 13 communicating with the second surface 103. A ring flange 131 extends along an internal peripheral wall of the receiving hole 13. A stopper block 133 is formed on the ring flange 131. Posts 15 are arranged on the second surface 103 around the receiving hole 13. The housing 10 includes a first side end 113, a second side end 117 and a top end 115. The first side end 113 is opposite to the second side end 117. The first side end 113 and the second side end 117 respectively define two grooves 114. Each groove 114 is substantially L-shaped. The top end 115 defines two locking holes 1151.

The cover 20 is a substantially rectangular board including a cover portion 21, a first side board 211, a second side board 213 and a third side board 215 respectively extend from three connected edges the cover portion 21. Thus, the cover 20 forms an open end. The cover 20 forms a latching portion 23 at the open end. The latching portion 23 is substantially board-shaped, and extends out from the open end of the cover portion 21. The latching portion 23 defines a cutout 232 and an inner edge 231. The inner edge 231 includes two sloped parts 2311, two arcuate parts 2313 and a connecting part 2314. The connecting part 2314 defines a recess 2315. The first side board 211 and the third side board 215 respectively form two protrusions 212 for being received in a corresponding groove 114. Each protrusion 212 defines a notch 2121. The second side board 213 forms two tabs 2131 for being receiving in a corresponding locking hole 1151.

The locking mechanism 30 includes an operating member 31, an elastic member 33 and a support member 35.

The operating member 31 is substantially disked-shape, and includes a top surface 311 and a bottom surface 313. The top surface 311 is recessed toward the bottom surface 313. An operating handle 3111 can be integrally formed with the top surface 311. The bottom surface 313 forms a locking block 3131. The locking block 3131 can be parallel to the operating handle 3111. The locking block 3131 is made of elastic material. The ends of the locking block 3131 are semicircular, corresponding to the shape of the recesses 2315. An extending portion 3121 is partially surrounded along an outer peripheral wall of the operating member 31, and a gap 3123 is defined between two ends of the extending portion 3121. In an exemplary embodiment, the gap 3123 is angled with 60 degrees.

The elastic member 33 is an arcuate helical spring, and an outer diameter of the elastic member 33 is substantially equal to a width of the extending portion 3121. A length of the elastic member 33 is larger than that of the gap 3123.

The support member 35 defines a through hole 351. A diameter of the through hole 351 is smaller than the diameter of the extending portion 3121 for supporting the extending portion 3121. Corners of the support member 35 may define post holes 353 for receiving corresponding posts 15.

Figure 3:
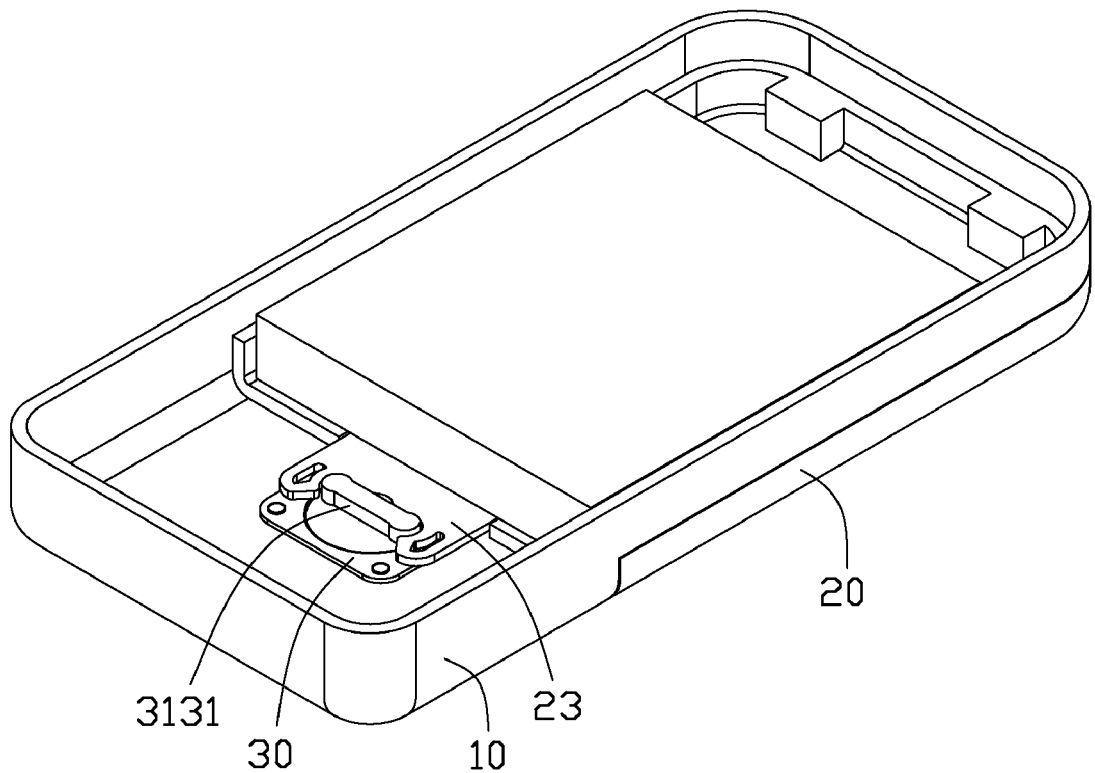
FIG. 3 is an assembled view of the portable electronic device shown in FIG. 1.
Figure 4:
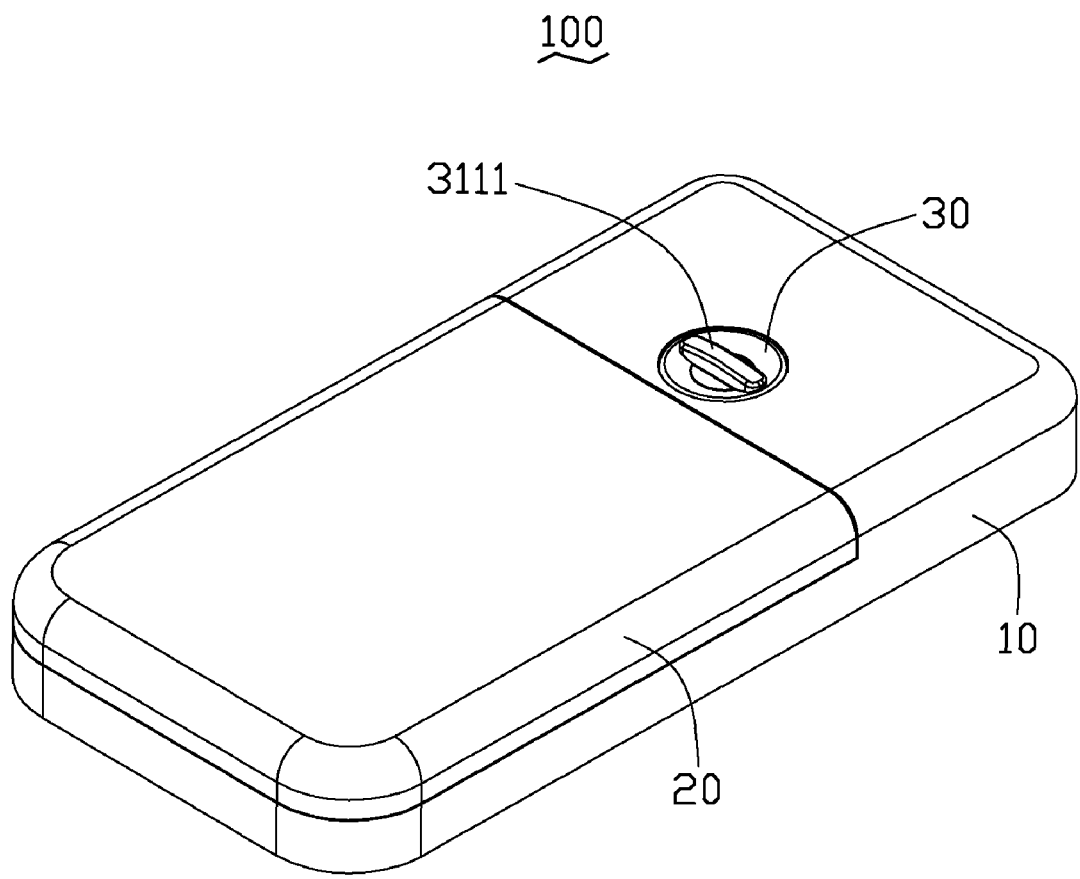
FIG. 4 is similar to FIG. 3, but viewed from another aspect.
Figure 5:
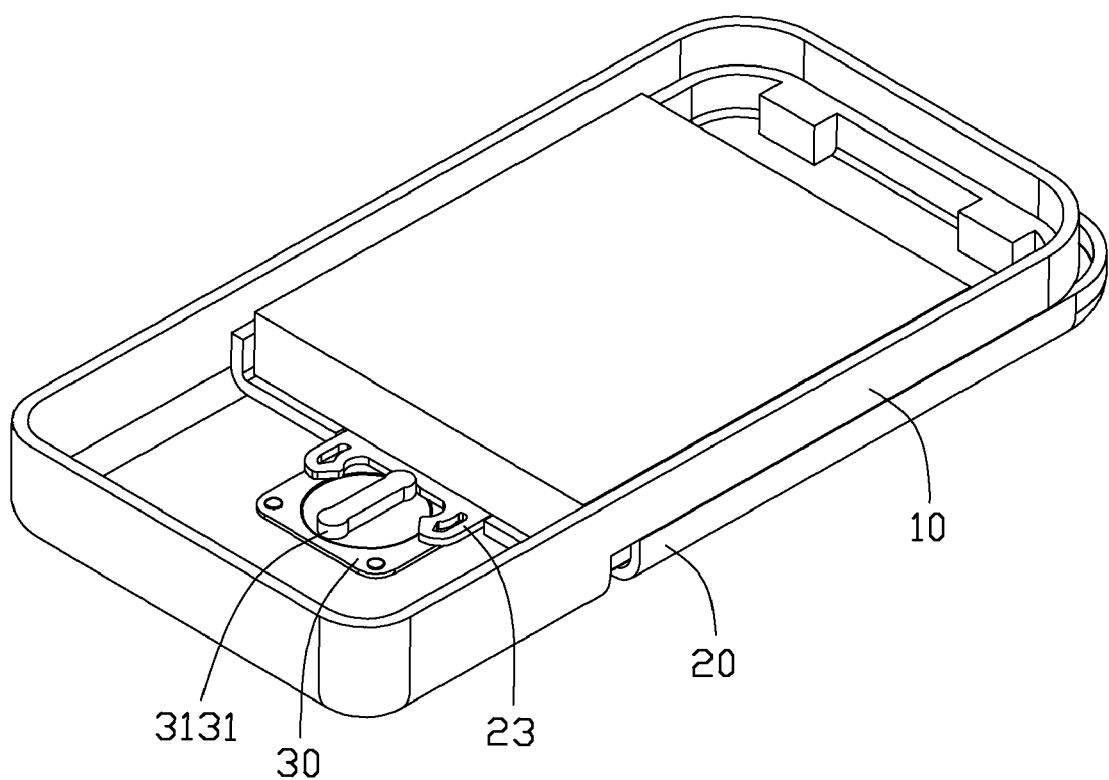
FIG. 5 is an open state view of the portable electronic device.
Figure 6:
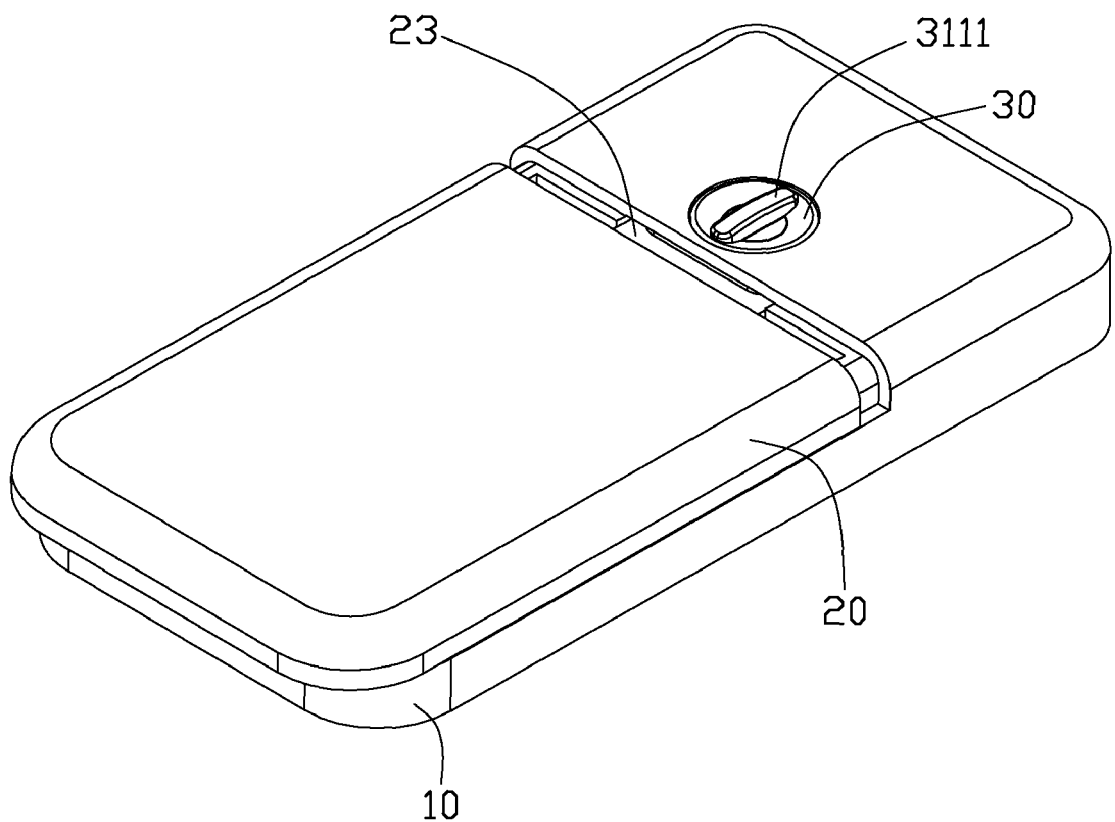
FIG. 6 is similar to FIG. 4, but viewed from another aspect.

During assembly of the battery cover assembly, referring to FIGS. 3 and 6, the operating member 31 passes through the receiving hole 13 and is exposed from the first surface 101 of the housing 10. One end of the extending portion 3121 abuts the stopper block 133. The elastic member 33 is received in the gap 3123, and is disposed between the stopper block 133 and the other end of the extending portion 3121. Next, the post holes 353 of the support member 35 are placed around the posts 15, and the support member 35 is fixed to the housing 10 by, e.g., ultrasonic welding. Thus, the operating member 31 is rotatably disposed in the housing 10.

To close the cover 20, the latching portion 23 is inserted into the slot 1111 of the housing 10. The cover 20 is pushed to allow the protrusions 212 to engage in the groove 114, and the tabs 2131 are locked in the locking hole 1151. Then, the operating member 31 is rotated to be deformedly engaged in two arcuate parts 2313 of the inner edge 231 of the latching portion 23. Therefore, the cover 20 is locked in the housing 10.

To open the cover 20, the operating handle 3111 is rotated. The locking block 3131 deforms to exit from the arcuate parts 2313. The elastic member 33 is compressed. When the locking block 3131 is rotated to about 90 degrees, the locking block 3131 is received in the connecting part 2314. The cover 20 is pushed toward outside, and the latching portion 23 of the cover 20 breaks away from the slot 111. The protrusions 212 and the tabs 2131 exit the grooves 114 and the locking holes, and the operating member 31 is automatically returned to an original position by the elastic member 33.

As described above, the exemplary embodiment provides a battery cover assembly for portable electronic devices, such as mobile phones. When the operating member is rotated, the cover of the battery cover assembly can be easily opened. This rotatable removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a housing having a planar surface defining a circular receiving hole;
   a removeable battery cover having a latching portion;
   a locking mechanism removeably latching the cover to the housing, the locking mechanism comprising:
      a disked-shaped operating member rotatably engaging in the circular receiving hole of the housing, the operating member including a locking block releasably and elastically abutting the latching portion;
      an elastic member, the elastic member arranged along one portion of an outer peripheral wall of the operating member, one end of the elastic member abutting the housing and the other end of the elastic member abutting the operating member, wherein the latching portion defines a cutout and inner edge, the locking block is received in the cutout and releasably abuts the inner edge, and wherein the circular receiving hole is co-planar with the planar surface, and the disked-shaped operating member lies in the planar surface.

2. The battery cover assembly as claimed in claim 1, wherein the locking block is made of elastic material, an operating handle is formed on the operating member, and is parallel to the locking block.

3. The battery cover assembly as claimed in claim 1, wherein the operating member includes an extending portion partially surrounded along the other portion of the outer peripheral wall of the operating member, and a gap is defined between two ends of the extending portion, the elastic member is received in the gap, one end of the extending portion abuts the stopper block, and the other end of the elastic member abuts the other end of the extending portion.

4. The battery cover assembly as claimed in claim 3, wherein the locking mechanism includes a support member, the support member is fixed to the housing, and supports the extending portion.

5. The battery cover assembly as claimed in claim 1, wherein the operating member includes an operating portion, the operating portion extends parallel and opposite to the locking block.

6. The battery cover assembly as claimed in claim 1, wherein the inner edge includes two sloped parts, two arcuate parts and a connecting part, the locking block locks with the arcuate parts.

7. A portable electronic device comprising:
   a housing having a planar surface defining a circular receiving hole;
   a removeable battery cover having a latching portion;
   a locking mechanism latching the cover to the housing, the locking mechanism comprising:
      a disked-shaped operating member rotatably engaging in the circular receiving hole of the housing, the operating member including a locking block releasably and elastically abutting the latching portion;
      an elastic member arranged along one portion of an outer peripheral wall of the operating member, one end of the elastic member abutting the housing and the other end of the elastic member abutting the operating member, wherein the latching portion defines a cutout and inner edge, the locking block is received in the cutout and releasably abuts the inner edge, and wherein the circular receiving hole is co-planar with the planar surface, and the disked-shaped operating member lies in the planar surface.

8. The portable electronic device as claimed in claim 7, wherein the elastic member provides an elastic force that returns the operating member to an original position.

9. The portable electronic device as claimed in claim 7, wherein the housing has a ring flange surrounding the receiving hole and a stopper block is formed in the ring flange, one end of the elastic member abuts the stopper block.

10. The portable electronic device as claimed in claim 9, wherein the operating member includes an extending portion and a gap, the extending portion is surrounded along the other portion of the outer peripheral wall of the operating member, the gap is defined between two ends of the extending portion, the elastic member is received in the gap, one end of the extending portion abuts the stopper block, and the other end of the elastic member abuts the other end of the extending portion.

* * * * *